United States Patent
Hurd et al.

(10) Patent No.: US 10,470,083 B2
(45) Date of Patent: Nov. 5, 2019

(54) NETWORK NODE AND METHOD IN A WIRELESS TELECOMMUNICATIONS NETWORK

(71) Applicant: Telefonaktiebolaget LM Ericsson (publ), Stockholm (SE)

(72) Inventors: Magnus Hurd, Stockholm (SE); Anders Johansson, Hässelby (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 27 days.

(21) Appl. No.: 15/757,150

(22) PCT Filed: Sep. 29, 2015

(86) PCT No.: PCT/SE2015/051031
§ 371 (c)(1),
(2) Date: Mar. 2, 2018

(87) PCT Pub. No.: WO2017/058068
PCT Pub. Date: Apr. 6, 2017

(65) Prior Publication Data
US 2018/0279177 A1    Sep. 27, 2018

(51) Int. Cl.
*H04W 28/16* (2009.01)
*H04W 24/08* (2009.01)
*H04W 72/04* (2009.01)

(52) U.S. Cl.
CPC .......... *H04W 28/16* (2013.01); *H04W 24/08* (2013.01); *H04W 72/042* (2013.01)

(58) Field of Classification Search
None
See application file for complete search history.

(56) References Cited

U.S. PATENT DOCUMENTS 9,490,951 B2* 11/2016 Seo ................ H04L 5/0053
9,749,074 B2*  8/2017 Ji ................... H04L 5/0055
(Continued)

FOREIGN PATENT DOCUMENTS

WO   WO 2013/085438 A1   6/2013
WO   WO 2014/040617 A1   3/2014

OTHER PUBLICATIONS

International Search Report and Written Opinion of the International Searching Authority for International Application No. PCT/SE2015/051031 dated May 31, 2016, 12 pages.

*Primary Examiner* — Michael J Moore, Jr.
(74) *Attorney, Agent, or Firm* — Sage Patent Group

(57) ABSTRACT

A network node determines a system load of the network node for the UE. When the UE is capable of receiving control information on EPDCCH, the system load is determined based on a first and a second system load metrics on a physical resource shared by PDSCH and EPDCCH, which first load metrics comprises a load due to EPDCCH and a load due to multiplexed PDSCH and which second load metrics comprises a load due to multiplexed EPDCCH and a load due to PDSCH. When the UE is not capable of receiving control information on EPDCCH, the system load is determined based on the first system load metrics on the physical resource shared by the PDSCH and EPDCCH and a third system load metrics on a physical resource for carrying PDCCH. The network node further determines whether or not to allocate resources to the UE based on the determined system load metrics.

18 Claims, 7 Drawing Sheets

(56) References Cited

U.S. PATENT DOCUMENTS

| | | | |
|---|---|---|---|
| 2013/0242890 A1* | 9/2013 | He | H04W 72/0413 370/329 |
| 2013/0242947 A1* | 9/2013 | Chen | H04W 72/04 370/335 |
| 2013/0301562 A1* | 11/2013 | Liao | H04W 72/042 370/329 |
| 2014/0036810 A1* | 2/2014 | Harrison | H04W 72/042 370/329 |
| 2014/0071934 A1* | 3/2014 | Frenne | H04L 5/001 370/330 |
| 2018/0152857 A1* | 5/2018 | Johansson | H04W 72/1263 |
| 2018/0242318 A1* | 8/2018 | Christensson | H04W 52/0206 |
| 2018/0332590 A1* | 11/2018 | Johansson | H04W 72/042 |

\* cited by examiner

NETWORK NODE AND METHOD IN A WIRELESS TELECOMMUNICATIONS NETWORK

CROSS REFERENCE TO RELATED APPLICATION

This application is a 35 U.S.C. § 371 national stage application of PCT International Application No. PCT/SE2015/051031, filed on Sep. 29, 2015, the disclosure and content of which is incorporated by reference herein in its entirety.

TECHNICAL FIELD

Embodiments herein relate to a network node and a method therein. In particular, a method and a network node for allocating resources to a User Equipment, UE, are disclosed.

BACKGROUND

Communication devices such as User Equipments (UEs) are enabled to communicate wirelessly in a cellular communications network or wireless communication system, sometimes also referred to as a cellular radio system or cellular networks. The communication may be performed e.g. between two UEs, between a UE and a regular telephone and/or between a UE and a server via a Radio Access Network (RAN) and possibly one or more core networks, comprised within the cellular communications network.

UEs may further be referred to as wireless terminals, mobile terminals and/or mobile stations, mobile telephones, cellular telephones, laptops, tablet computers or surf plates with wireless capability, just to mention some further examples. The UEs in the present context may be, for example, portable, pocket-storable, hand-held, computer-comprised, or vehicle-mounted mobile devices, enabled to communicate voice and/or data, via the RAN, with another entity, such as another wireless terminal or a server. The following commonly terminologies are used in the embodiments and are elaborated below:

The non-limiting term radio network node is more commonly used and it refers to any type of network node serving UE and/or connected to other network node or network element or any radio node from where UE receives signal. Examples of radio network nodes are Node B, base station (BS), multi-standard radio (MSR) radio node such as MSR BS, eNode B, network controller, radio network controller (RNC), base station controller, relay, donor node controlling relay, base transceiver station (BTS), access point (AP), transmission points, transmission nodes, RRU, RRH, nodes in distributed antenna system (DAS) etc.

A more general term "network node" is used and it can correspond to any type of radio network node or any network node, which communicates with at least a radio network node. Examples of network node are any radio network node stated above, core network node (e.g. MSC, MME etc), O&M, OSS, SON, positioning node (e.g. E-SMLC), MDT etc.

The cellular communications network covers a geographical area which is divided into cell areas, wherein each cell area being served by a network node. A cell is the geographical area where radio coverage is provided by the network node.

The network node may further control several transmission points, e.g. having Radio Units (RRUs). A cell can thus comprise one or more network nodes each controlling one or more transmission/reception points. A transmission point, also referred to as a transmission/reception point, is an entity that transmits and/or receives radio signals. The entity has a position in space, e.g. an antenna. A network node is an entity that controls one or more transmission points. The network node may e.g. be a base station such as a Radio Base Station (RBS), eNB, eNodeB, NodeB, B node, or BTS (Base Transceiver Station), depending on the technology and terminology used. The base stations may be of different classes such as e.g. macro eNodeB, home eNodeB or pico base station, based on transmission power and thereby also cell size.

Further, each network node may support one or several communication technologies. The network nodes communicate over the air interface operating on radio frequencies with the UEs within range of the network node. In the context of this disclosure, the expression Downlink (DL) is used for the transmission path from the base station to the mobile station. The expression Uplink (UL) is used for the transmission path in the opposite direction i.e. from the UE to the base station.

In 3rd Generation Partnership Project (3GPP) Long Term Evolution (LTE), base stations, which may be referred to as eNodeBs or even eNBs, may be directly connected to one or more core networks. In LTE the cellular communication network is also referred to as Evolved Universal Terrestrial Radio Access Network (E-UTRAN).

An E-UTRAN cell is defined by certain signals which are broadcasted from the eNB. These signals contain information about the cell which can be used by UEs in order to connect to the network through the cell. The signals comprise reference and synchronization signals which the UE uses to find frame timing and physical cell identification as well as system information which comprises parameters relevant for the whole cell.

A UE needing to connect to the network must thus first detect a suitable cell, as defined in 3GPP TS 36.304 v11.5.0. The UE can be in either idle state, which is also referred to as IDLE or RRC_IDLE, or in connected state, which state is also referred to as CONNECTED or RRC_CONNECTED. When the UE is in RRC_IDLE, it monitors a paging channel, which paging channel is part of a Paging Control Channel (PCCH) at a logical level, a Paging Channel (PCH) on a transport channel level and a Physical Downlink Shared Channel (PDSCH) on a physical channel level. While doing so the UE typically also performs a number of radio measurements which it uses to evaluate the best cell, such as Reference Signal Receive Power (RSRP), Reference Symbol Received Quality (RSRQ) or Received Signal Strength Indicator (RSSI). This is performed by measuring on received reference signals and/or parts of a spectrum which comprises reference signals sent by cells. This may also be referred to as "listening" for a suitable cell.

A suitable cell is commonly a cell which has RSRQ or RSRP above a certain level. The cell with the highest RSRP or RSRQ may be referred to as the best cell or the best suitable cell. Listening for a suitable cell may comprise searching for reference signals transmitted from one or more network nodes in an OFDM subframe. When the best suitable cell is found the UE performs random access, according to a system information for the cell. This is done in order to transmit a Radio Resource Control (RRC) connection setup request to the network node. Assuming the random access procedure succeeds and the network node receives the request, the network node will either answer with an RRC connection setup message, which acknowledges the UEs request and tells it to move into RRC connected state, or an RRC connection reject, which tells the UE that it may not connect to the cell. In RRC connected state the parameters necessary for communication between the network node and the UE are known to both entities and a data transfer between the two entities is enabled.

When the UE is in RRC_CONNECTED state the UE continues to measure RSRP, as well as an input to connected mode mobility decisions, such as e.g. performing a handover from one cell to another. These measurements are typically performed in the full bandwidth, which may also be referred to as the full spectrum, of the subframe.

RSRP is a measurement of the signal strength of an LTE cell which helps the UE to rank the different cells according to their signal strength as input for handover and cell reselection decisions. The RSRP is an average of a power of all resource elements which carry Cell-specific Reference Signals (CRS) over the entire bandwidth. It is therefore only measured in OFDM symbols carrying CRS.

In a mobile radio communication systems air interface resources are allocated to UEs on a short timescale. This allocation task may be performed by a scheduler in the network node. The scheduler tries to assign resources to a UE to fulfill Quality of Service (QoS) requirements. The QoS requirements are in LTE expressed per radio bearer, represented by QoS Class Identifier (QCI) and Allocation and Retention Priority (ARP). Whenever the scheduler is congested, i.e. when there are no available resources for scheduling UEs, the scheduler assigns resources such that the QoS requirements are fulfilled in the order indicated by the priority of the QoS. In LTE, these resources are typically CCEs of the PDCCH and Physical Resource Blocks (PRBs) of PDSCH/PUSCH. In LTE 3GPP Rel-11 a new downlink control channel, EPDCCH, is introduced. Similar to PDCCH, EPDCCH may be used to transmit Downlink Control Indications (DCI) to UEs connected to the cell. A difference between PDCCH and EPDCCH is that while PDCCH is transmitted in a control region, separate from the region used for PDSCH, the EPDCCH is multiplexed with PDSCH. There are however some problems related to this way of prioritizing with respect to QoS requirements.

Firstly, some radio bearers may not have any QoS requirements at all, these may e.g. be referred to as best-effort or non-Guaranteed Bit Rate (non-GBR) bearers. This means that scheduling will not consider these radio bearers in congested scenarios. Hence, there is a risk that this class of radio bearers is starved out since only radio bearers with specified QoS requirements are scheduled.

Secondly, if too many radio bearers with QoS requirements are admitted the scheduler will at some point fail to provide resources to all of these radio bearers. Users may have been admitted at a point in time when radio conditions and mobility were favorable in the sense that QoS could be provided. Hence, due to increasing mobility and worsened radio conditions the resources may at a later point in time not be enough to provide QoS for the admitted radio bearers.

SUMMARY

It is therefore an object of embodiments herein to enhance the performance in a wireless communications network and improve the QoS of the admitted radio bearers in a congested wireless communications network.

According to a first aspect of embodiments herein, the object is achieved by a method, performed by a network node, for allocating resources to a User Equipment, UE. The network node operates in a wireless communication network and serves the UE. The network node determines a system load of the network node for the UE. When the UE is adapted to receive control information on EPDCCH, the system load is determined based on a first system load metrics on a physical resource shared by a Physical Downlink Shared CHannel, PDSCH, and EPDCCH. The first load metrics comprises a load due to EPDCCH and a load due to multiplexed PDSCH, and a second system load metrics on the physical resource shared by the PDSCH and the EPDCCH. The second load metrics comprises a load due to multiplexed EPDCCH and a load due to PDSCH. When the UE is not capable of receiving control information on EPDCCH, the system load is determined based on the first system load metrics on the physical resource shared by the PDSCH and EPDCCH. The first load metrics comprises a load due to EPDCCH and a load due to multiplexed PDSCH and a third system load metrics on a physical resource for carrying Physical Downlink Control CHannel, PDCCH. The network node further determines whether or not to allocate resources to the UE based on the determined system load metrics.

According to a second aspect of embodiments herein, the object is achieved by a network node configured to perform a method for allocating resources to a User Equipment, UE. The network node operates in a wireless communication network and serves the UE. The network node is configured to determine a system load for the UE. When the UE is adapted to receive control information on EPDCCH, the network node is configured to determine the system load is based on a first system load metrics on a physical resource shared by a Physical Downlink Shared CHannel, PDSCH, and EPDCCH, which first load metrics comprises a load due to EPDCCH and a load due to multiplexed PDSCH, and a second system load metrics on the physical resource shared by the PDSCH and the EPDCCH, which second load metrics comprises a load due to multiplexed EPDCCH and a load due to PDSCH. When the UE is not adapted to receive control information on EPDCCH, the network node is configured to determine the system load is based on the first system load metrics on the physical resource shared by the PDSCH and EPDCCH, which first load metrics comprises a load due to EPDCCH and a load due to multiplexed PDSCH, and a third system load metrics on a physical resource for carrying Physical Downlink Control CHannel, PDCCH. The network node is further configured to determine whether or not to allocate resources to the UE based on the determined system load metrics.

By determining the UEs capability of receiving control information on EPDCCH and determining the system load based on the capability to receive control information on EPDCCH, it is possible to have Admission Control with respect to the physical resource shared by PDSCH and EPDCCH. Further, it is possible to consider the PDCCH resource for the sake of admission control only, for UEs not capable of receiving control info on EPDCCH. Thereby, the network node may perform a more accurate admission control.

An advantage of embodiments herein, is that they provide a simple solution how to evaluate service requests from UEs depending on the UEs capability of receiving control information on EPDCCH.

BRIEF DESCRIPTION OF THE DRAWINGS

Examples of embodiments herein are described in more detail with reference to attached drawings in which.

DETAILED DESCRIPTION

In this section, the embodiments herein will be illustrated in more detail by a number of exemplary embodiments. It should be noted that these embodiments are not mutually exclusive. Components from one embodiment may be tacitly assumed to be present in another embodiment and it will be obvious to a person skilled in the art how those components may be used in the other exemplary embodiments.

Figure 1:
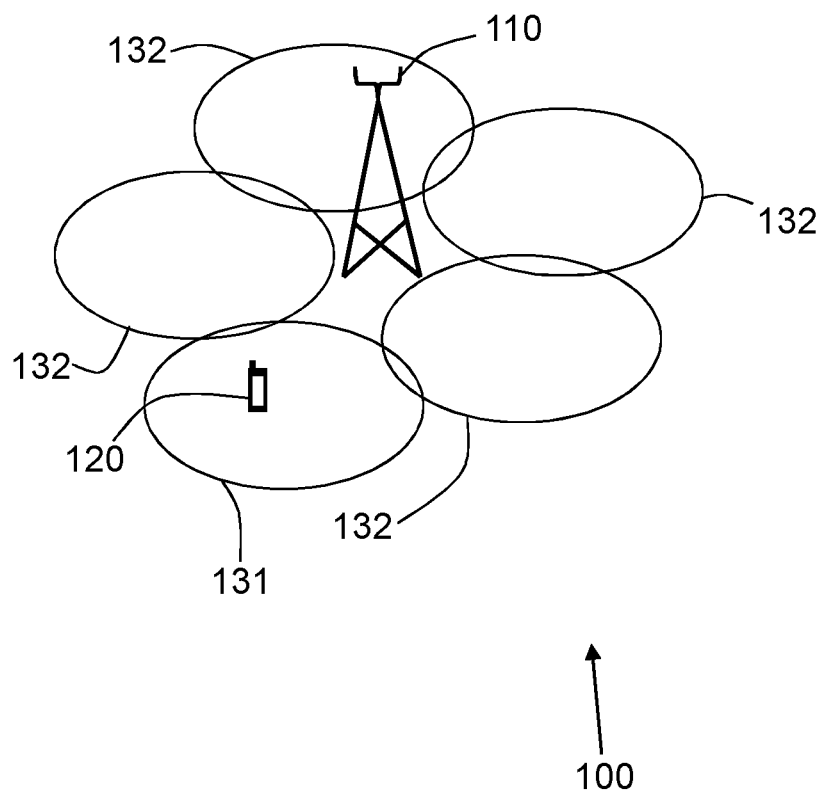
FIG. 1 is a schematic diagram illustrating embodiments of a wireless communications network.

FIG. 1 depicts an example of a wireless communications network 100 according to a first scenario in which embodiments herein may be implemented. The wireless communications network 100 is a wireless communication network such as an LTE, E-Utran, WCDMA, GSM network, any 3GPP cellular network, Wimax, or any cellular network or system.

The wireless communications network 100 comprises a plurality of network nodes wherein a first network node 110 is depicted in FIG. 1. The first network node 110 is a network node which may be a transmission point such as a radio base station, for example an eNB, an eNodeB, or an Home Node B, an Home eNode B or any other network node capable to serve a wireless terminal such as a user equipment or a machine type communication device in a wireless communications network. The first network node 110 may serve a plurality of cells 131, 132.

A set of UEs 120 operates in the wireless communications network 100, which set may comprise one or more UEs 120. The UE 120 may be a legacy UE or a UE capable of receiving control information on EPDCCH. The first network node 110 may be a transmission point for the UE 120. The UE 120 is within radio range of the first network node 110, this means that it can hear signals from the first network node 110.

The UE 120 may e.g. be a wireless terminal, a wireless device, a mobile wireless terminal or a wireless terminal, a mobile phone, a computer such as e.g. a laptop, a Personal Digital Assistant (PDA) or a tablet computer, sometimes referred to as a surf plate, with wireless capability, or any other radio network units capable to communicate over a radio link in a wireless communications network. Please note the term wireless terminal used in this document also covers other wireless devices such as Machine to machine (M2M) devices.

Some embodiments herein relate to an Admission Control function that monitors the resources handled by the scheduler. The Admission Control may strive towards having the load due to radio bearers with QoS requirements below an admission threshold expressed as a percentage of the maximum amount of the resource. It may do so by rejecting initial access whenever load due to radio bearers with QoS requirements is above the admission threshold. The admission threshold may for instance relate to the contribution from all the Guaranteed Bitrate (GBR) Bearers.

UEs may be classified based on whether they are capable of receiving control information by means of EPDCCH. The network node 110 may disregard from load on the PDCCH resource when admitting or rejecting service requests from UEs which are EPDCCH capable. The network node 110 may consider load due to allocating EPDCCH and load due to allocating PDSCH as being represented by a single resource. The load on that resource may be considered when any UE 120 is requesting resources from the network node 110.

Figure 2:
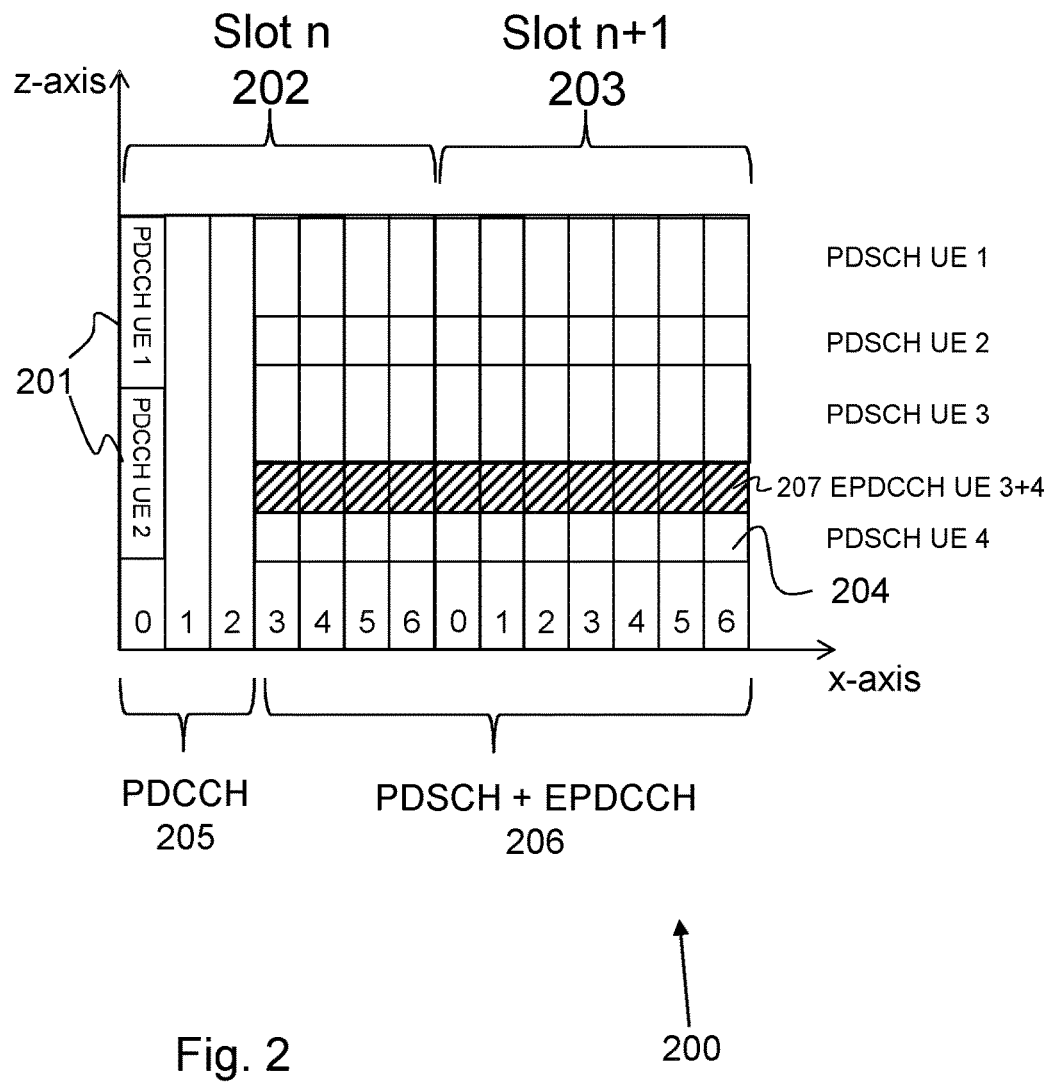
FIG. 2 is a schematic block diagram illustrating embodiments of a LTE resource grid.

FIG. 2 schematically discloses an LTE resource grid 200 in downlink according to embodiments herein. The resource grid 200 may also be referred to as a subframe. Each subframe comprises two slots 202 and 203. Each slot comprising a number of resource elements (RE) 204 extending both in the time domain (x-axis) and in the frequency domain (z-axis). Each RE's 204 extension in the frequency domain is referred to as a sub-carrier whereas the extension in the time domain is referred to as an OFDM symbol. In the time domain, LTE downlink transmissions are organized into radio frames of 10 ms, wherein each radio frame comprises ten equally-sized subframes. Furthermore, the resource allocation in LTE is typically described in terms of PRBs, comprising a plurality of REs 204. A PRB corresponds to one slot in the time domain and 12 contiguous subcarriers in the frequency domain. The two PRBs defined by the slot n 202 and the slot n+1 203 may be referred to as a PRB-pair.

Downlink and uplink transmissions are dynamically scheduled, i.e. in each subframe the network node 130 transmits control information about to or from which UE 120 data is transmitted and upon which resource blocks the data is transmitted. The control information may comprise system information, paging messages and/or random access response messages. The control information for a given UE 120 is transmitted using one or multiple PDCCHs 201. Control information of a PDCCH 201 is transmitted in the control region of each subframe. FIG. 2 shows an exemplary size of a normal control region of three OFDM symbols allocated for control signaling, for example the PDCCH 201. The size of the control region may however be dynamically adjusted according to the current traffic situation. In the example shown in the figure only the first OFDM symbol out of the three available is used for control signaling. Typically the control region may comprise a plurality of PDCCHs 201 carrying control information to multiple UEs 120 simultaneously, such as PDDCH 201 for a UE 1 and a UE 2 as disclosed in FIG. 2.

The PDCCH resource 205 may be separated from a region carrying PDSCH and EPDCCH, which region is referred to as PDSCH+EPDCCH 206 in FIG. 2. This is due to that the PDCCH 205 region, depending on the available bandwidth, cannot extend beyond the three or four first OFDM symbols. Therefore, the PDCCH 205 resource may be viewed as a system resource of its own. Each EPDCCH is transmitted on one or several PRB-pairs, that may be multiplexed with the PRB-pairs used for PDSCH. Several EPDCCHs may also be multiplexed in the PRB-pairs allocated to EPDCCH. It is furthermore possible to multiplex EPDCCH and PDSCH within one PRB-pair in a time and/or a frequency plane. By multiplexing EPDCCH and PDSCH the capacity of the network may be increased since both EPDCCH and PDSCH may be transmitted in the same region of the LTE resource grid. EPDCCH may also support spatial multiplexing for different UEs with overlapping EPDCCHs, i.e. several EPDCCH may share Resource Elements.

As can be seen in FIG. 2, EPDCCH is scheduled on resources that potentially may be used for PDSCH, in the region 206 referred to as PDSCH+EPDCCH. Therefore, in embodiments herein a load metrics representing the shared resource PDSCH+EPDCCH 206 may be defined. From that resource pool both PDSCH and EPDCCH consume resources. The unit for the load metrics may be resource elements. It may however also be any other unit that both PDSCH and EPDCH allocation may be translated into, in order to have a fair cost model for the shared resource.

In some embodiments several EPDCCHs 207 may share resource elements, as can be seen for a UE 3 and a UE 4 in FIG. 2. This corresponds to the case localized EPDCCH with spatial multiplexing. Spatial multiplexing may be supported by allocating different EPDCCHs on different antenna ports using the same resource element. An antenna port is typically mapped to a single physical antenna. With the localized EPDCCH with spatial multiplexing scheme the different EPDCCHs may share the same resource element in a baseband although they will be transmitted on different antenna ports and thus facilitate spatial multiplexing. If sharing resource elements is possible, multiplexing may be considered when calculating the cost of using a resource element. If a resource element can be shared by X number of EPDCCHs, then the cost of using a resource element may be considered to be 1/X. Likewise, there may be sharing due to spatial multiplexing also for PDSCH in which case a similar cost model may be applied.

However, there cannot be any spatial multiplexing onto a resource element between PDSCH and EPDCCH. There may be multiplexing of PDSCH and EPDCCH onto one PRB pair, which is represented by slot n 202 and slot n+1 203 in FIG. 2. However, that multiplexing occurs in the time and frequency domain, not in the spatial domain, and therefore involves different resource elements. Strictly, this means the cost of allocating EPDCCH is different compared to PDSCH. To represent the difference in terms of EPDCCH and PDSCH load, the load on the common resource 206 may be split into two load metrics, which are referred to as "type PDSCH" 401 and "type EPDCCH" 402. These load metrics are further described in FIGS. 4 and 5. For "type EPDCCH" 402 the load metric considers the multiplexing of EPDCCH on a resource element and disregards from multiplexing of PDSCH, since EPDCCH cannot be multiplexed on resource elements used by PDSCH. For "type PDSCH" 401 the load metric considers multiplexing of PDSCH and disregards from the multiplexing of EPDCCH since PDSCH cannot be multiplexed on resource elements used by EPDCCH.

Embodiments herein consider metrics representing air interface system resources. The load may be calculated as explained in the following. The procedure to calculate the load is done for any kind of resource.

Example of embodiments of a method in the network node 110 for allocating resources to a User Equipment, UE, will now be described with reference to a flowchart depicted in FIG. 3. The network node 110 operates one or more cells in a wireless communication network and serves the UE.

The method may comprise the following actions, which actions may be taken in any suitable order. Dashed lines of a box in FIG. 3 indicate that this action is not mandatory.

Action 301

The network node 110 may receive a request for resources from a UE 120 wanting to start a new transmission to the network node 110.

Action 302

When the network node 110 has received the request for resources from the UE 120, the network node 110 detects whether or not the UE 120 is adapted to receive control information by means of EPDCCH. A UE 120 which is not able to receive control information by means of EPDCCH may hereinafter be referred to as a legacy UE.

The network node 110 may detect if the UE 120 is adapted to receive control information by means of EPDCCH by performing the following actions 303 and 304

Action 303

In order to detect if the UE 120 is adapted to receive control information via EPDCCH, the network node 110 may send a message to the UE 120, which message comprises a request for the UEs 120 capability to receive control information by means of EPDCCH.

Action 304

After the network node 110 has sent the message comprising the request, the network node 110 may receive a message from the UE 120. The message comprises the UEs 120 capability to receive control information by means of EPDCCH.

Action 305

The network node 110 determines a system load of the network node 110 for the UE 120. The system load of the network node 110 for the UE 120 may also be referred to as the load which the UE 120 exerts on the network node 110. When the UE 120 is adapted to receive control information on EPDCCH, the system load is determined based on a first system load metrics and on a second system load metrics on a physical resource shared by PDSCH and EPDCCH. The first system load metrics comprises a load due to EPDCCH and a load due to multiplexed PDSCH. The second load metrics comprises a load due to multiplexed EPDCCH and a load due to PDSCH.

Figure 3:
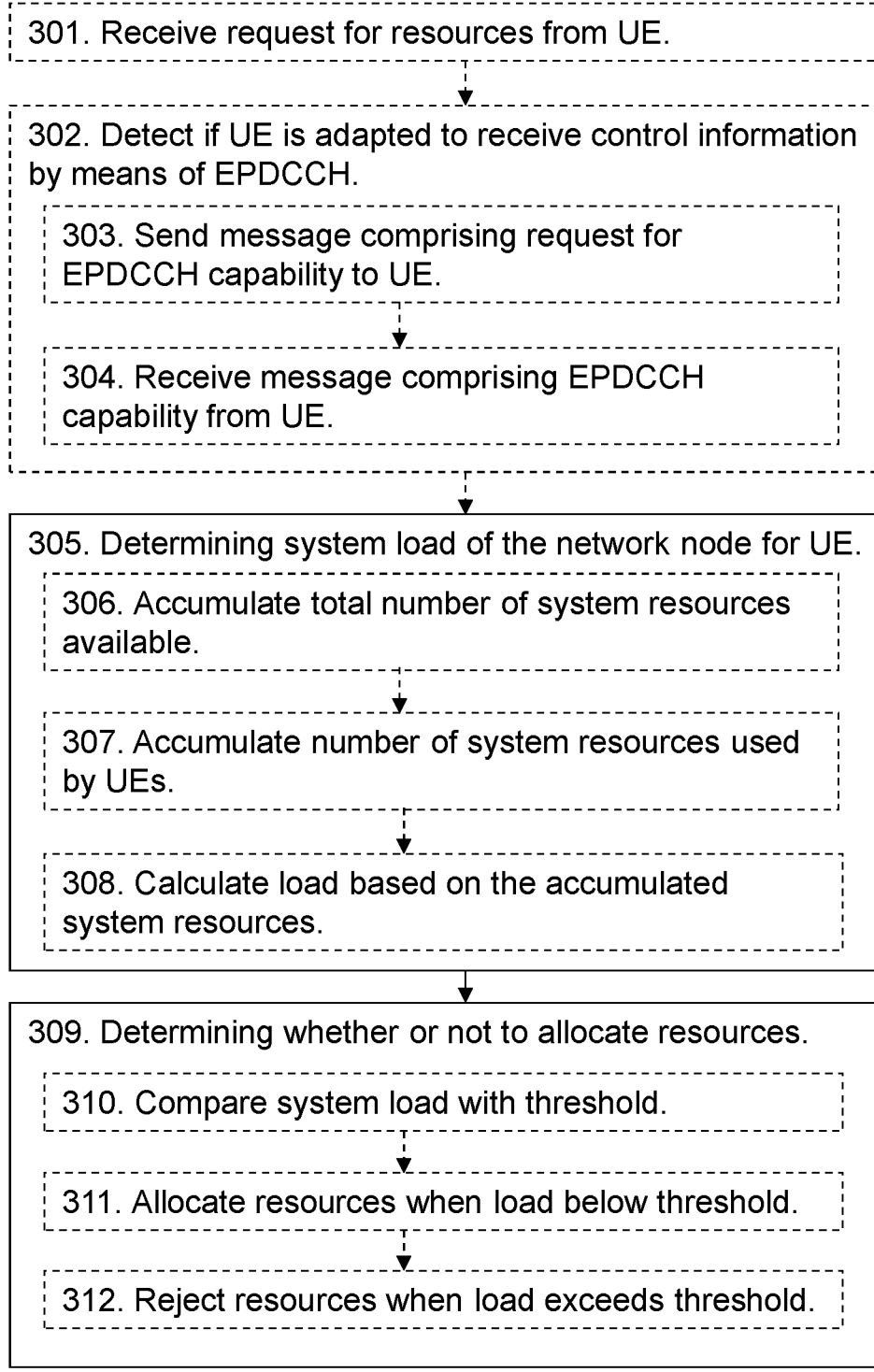
FIG. 3 is a flowchart depicting embodiments of a method in a network node.
Figure 4:
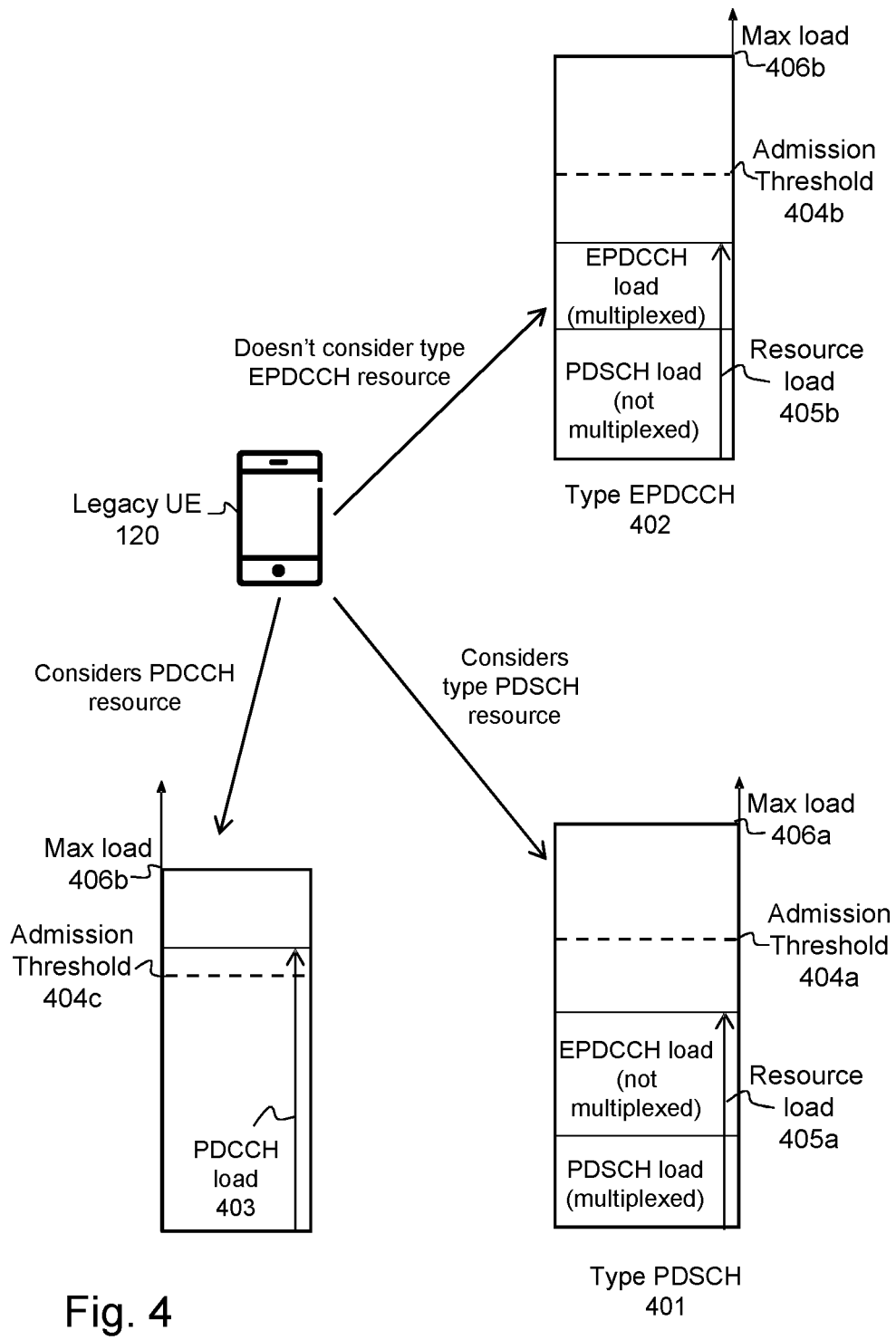
FIG. 4 is a block diagram illustrating embodiments of the method herein.
Figure 5:
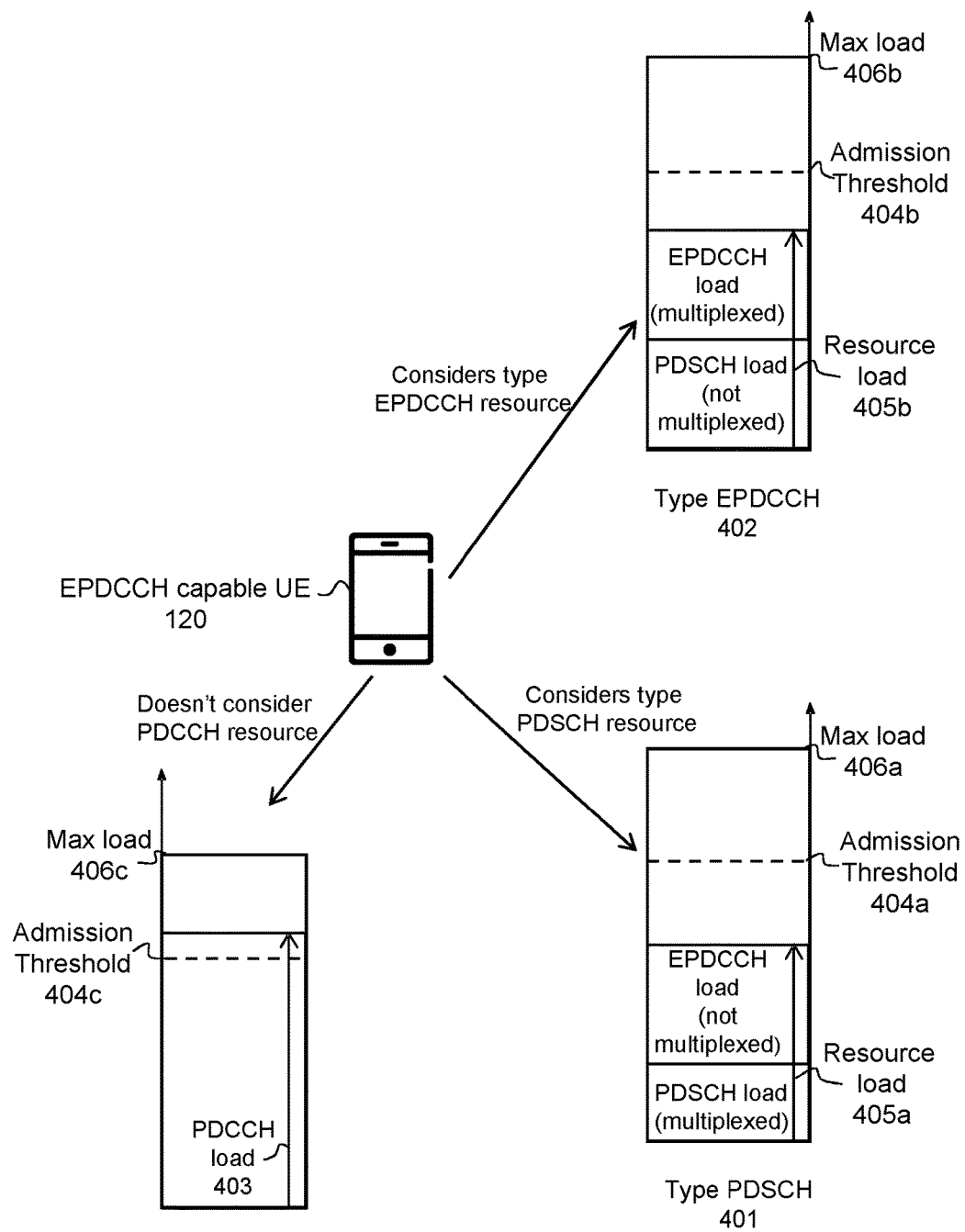
FIG. 5 is a block diagram illustrating embodiments of the method herein.

An example of the two different load metrics on the physical resource 206 shared by PDSCH and EPDCCH can be seen in FIG. 4 for a legacy UE 120 and in FIG. 5 for a EPDCCH capable UE 120. The load metric referred to as "type PDSCH" 401 makes sure there is margin enough for allocating PDSCH, while considering that multiplexing between PDSCH and EPDCCH on the same resource elements is not possible whereas multiplexing of PDSCH onto the same resource elements is possible. As described for FIG. 3, the type PDSCH load metric 401 considers multiplexing of PDSCH and disregards from the multiplexing of EPDCCH when calculating the resource load 405a on the shared resource 206. The resource load 405a is the combined load of the multiplexed PDSCH and the non-multiplexed EPDCCH.

The load metric referred to as "type EPDCCH" 402 on the other hand makes sure there is margin enough for allocating EPDCCH, while considering that multiplexing between PDSCH and EPDCCH on the same resource elements is not possible whereas multiplexing of EPDCCH onto the same resource elements is possible. The type EPDCCH load metric 402 considers multiplexing of EPDCCH and disregards from the multiplexing of PDSCH when calculating the resource load 405b on the shared resource 206. The resource load 405b is the combined load of the multiplexed PDSCH and the non-multiplexed EPDCCH.

In a case where the network node 110 may allocate EPDCCHs to the UE 120 freely over the bandwidth the "type EPDCCH" resource 402 would consider all the resource elements defined by the bandwidth as available. If EPDCCH opportunities are not available in the whole bandwidth, the network node 110 may determine the maximum capacity, which may also be referred to as the max load, of the "type EPDCCH" resource 402 accordingly.

FIG. 4 discloses an example of a scenario where a legacy UE 120 visits a RAN. Since the legacy UE 120 in this example is not capable of receiving control information on EPDCCH, it requires PDCCH resources for control information. Hence, it disregards the type EPDCCH load metrics 402 and only considers the type PDSCH load metrics 401 for the physical resource 206 and the PDCCH load on the resource 205. In the embodiment disclosed in FIG. 4 however, since the PDCCH load 403 is above the admission threshold 404c, the legacy UE 120 will be rejected by the network node 110, e.g. by means of the admission control, due to PDCCH congestion. In a further scenario which is not disclosed herein, in which the PDCCH load 403 is below the admission threshold 404c and the resource load 405a for the PDSCH load metrics 401 also is below the threshold 404a, the network node 110 may allow the request and may allocate resources to the UE 120.

In FIG. 5 an EPDCCH-capable UE 120 visiting the RAN is shown. Since this UE 120 may receive control information on EPDCCH it does not require any PDCCH resources. Hence, the EPDCCH-capable UE 120 is not limited by the PDCCH congestion. The network node 110 may compare the resource loads 405a and 405b with the corresponding thresholds 404a and 405b of the load metrics 401 and 402. When both resource loads 405a and 405b are below the corresponding thresholds, the network node 110 may admit this UE 120 and may allocate resources to the UE 120. In case any of the type EPDCCH or type PDSCH resources had been congested, i.e. any of the resource loads 405a and 405b would have exceeded the corresponding threshold 404a and 404b, this UE 120 would have been rejected by the network node 110.

When the UE 120 is not adapted to receive control information on EPDCCH, the system load may be determined based on the first system load metrics on the physical resource shared by the PDSCH and EPDCCH, which first load metrics comprises a load due to EPDCCH and a load due to multiplexed PDSCH, and a third system load metrics on a physical resource for carrying Physical Downlink Control CHannel, PDCCH. In embodiments herein, the network node 110 may determine the load by performing the following actions 306-308.

Action 306

The network node 110 may determine the load by accumulating the total number of system resources available according to each one of the determined system load metrics, for a period of time, which may be referred to as the time T. The total number of resources corresponds to the maximum capacity of the resource, which may also be referred to as the maximum load.

Action 307

The network node 110 further accumulates the number of system resources that are used by UEs 120 connected to the network node 110 according to each one of the determined system load metrics, for the same period of time.

Action 308

When the network node 110 has accumulated the number of system resources, the network node 110 may calculate the load by dividing the amount of system resources used by UEs 120 with the total number of system resources available, when the period of time has expired.

In some embodiments herein, the number of system resources that are used by UEs 120 are only accumulated for UEs 120 which are allocated resources and are scheduled with a QoS requirement above a threshold, which may also be referred to as a UE 120 scheduled due to high priority driven by a QoS requirement.

Action 309

Figure 6A:
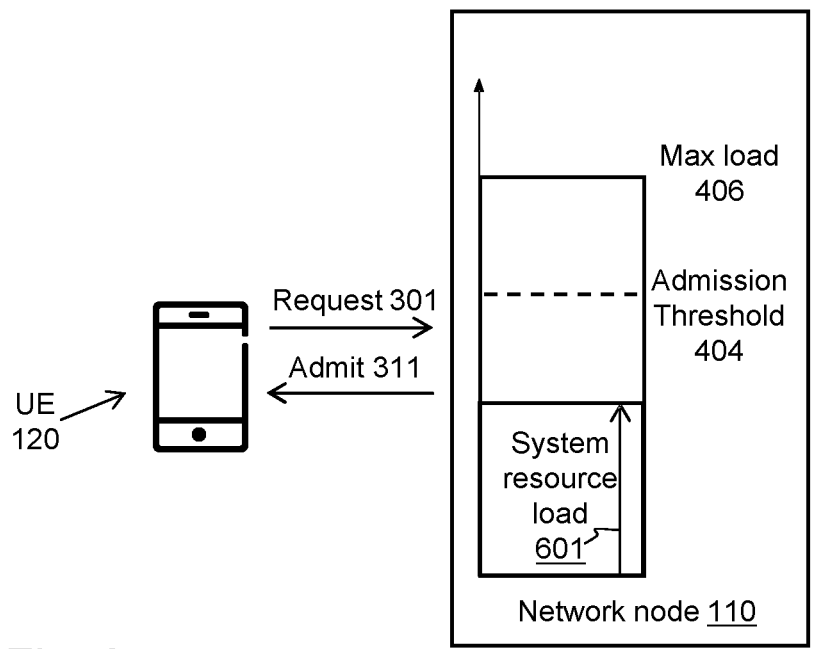
FIG. 6a is a flowchart depicting an admission of resources in a network node according to embodiments herein.
Figure 6B:
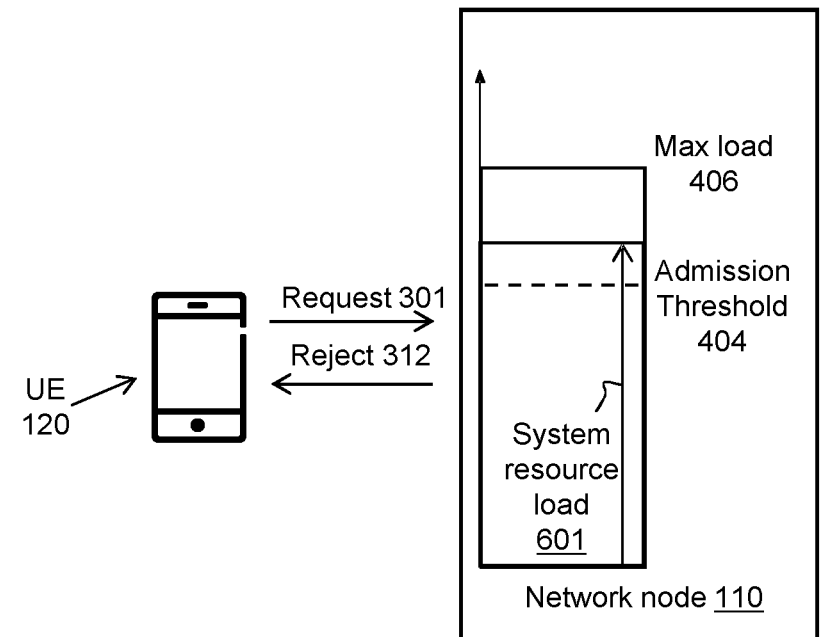
FIG. 6b is a flowchart depicting a/rejection of resources in a network node according to embodiments herein.

When the network node 110 has determined the system load it further determines whether or not to allocate resources to the UE 120 based on the determined system load metrics. FIGS. 6a and 6b discloses the step of determining whether or not to allocate resources to the UE 120.

In some embodiments herein the network node 110 allocates resources for transmission of control information on the physical resource for carrying EPDCCH, when the UE 120 is adapted to receive control information on EPDCCH. The network node 110 further allocates resources for transmission of control information on the physical resource for carrying PDCCH, when the UE 120 is not adapted to receive control information on EPDCCH.

The network node 110 may determine whether or not to allocate resources to the UE 120 by performing the following steps 310-312.

Action 310

Referring to FIGS. 3 and 6, in some embodiments herein the network node 110 may determine whether or not to allocate resources to the UE 120 by comparing each determined system load metrics 601, which may also be referred to as the system resource load, with the threshold 404, 404a, 404b, 404c. The system resource load 601 may in embodiments herein, be any of the PDCCH load 403, the resource load 405a and/or the resource load 405b.

Action 311

Further referring to FIGS. 3 and 6, when the calculated load metrics 401, 402, 403, 601 are below the threshold 404, 404a, 404b, 404c, the network node 110 may admit the request from the UE 120 and may allocate resources to the UE 120, which is shown in FIG. 6a. The admission of an allocation of resources to the UE 120 may be performed by an admission control in the network node 110.

Action 312

Further referring to FIGS. 3 and 6, when at least one of the determined load metrics 401, 402, 403, 601 exceeds the threshold 404, 404a, 404b, 404c, the network node 110 may reject the request 301 for resources from the UE 120, which is shown in FIG. 6b. The rejection of an allocation of resources to the UE 120 may be performed by the admission control in the network node 110.

In some embodiments herein, when a UE 120 which is adapted to receive EPDCCH is rejected, the network node 110 determines the load for the UE 120 based on the load metrics for a UE 120 not adapted to receive control information on EPDCCH. When the load metrics are below the threshold the network node 110 allocates the resources as for a UE 120 not adapted to receive control information on EPDCCH.

In some further embodiments herein the load metrics thresholds depend on a resource profile of the UE 120. The resource profile is a measure of the amount of resources typically used by the type of UE 120. The thresholds may be lower for a UE 120 with a high resource profile and higher for a UE 120 with a low resource profile.

Figure 7:
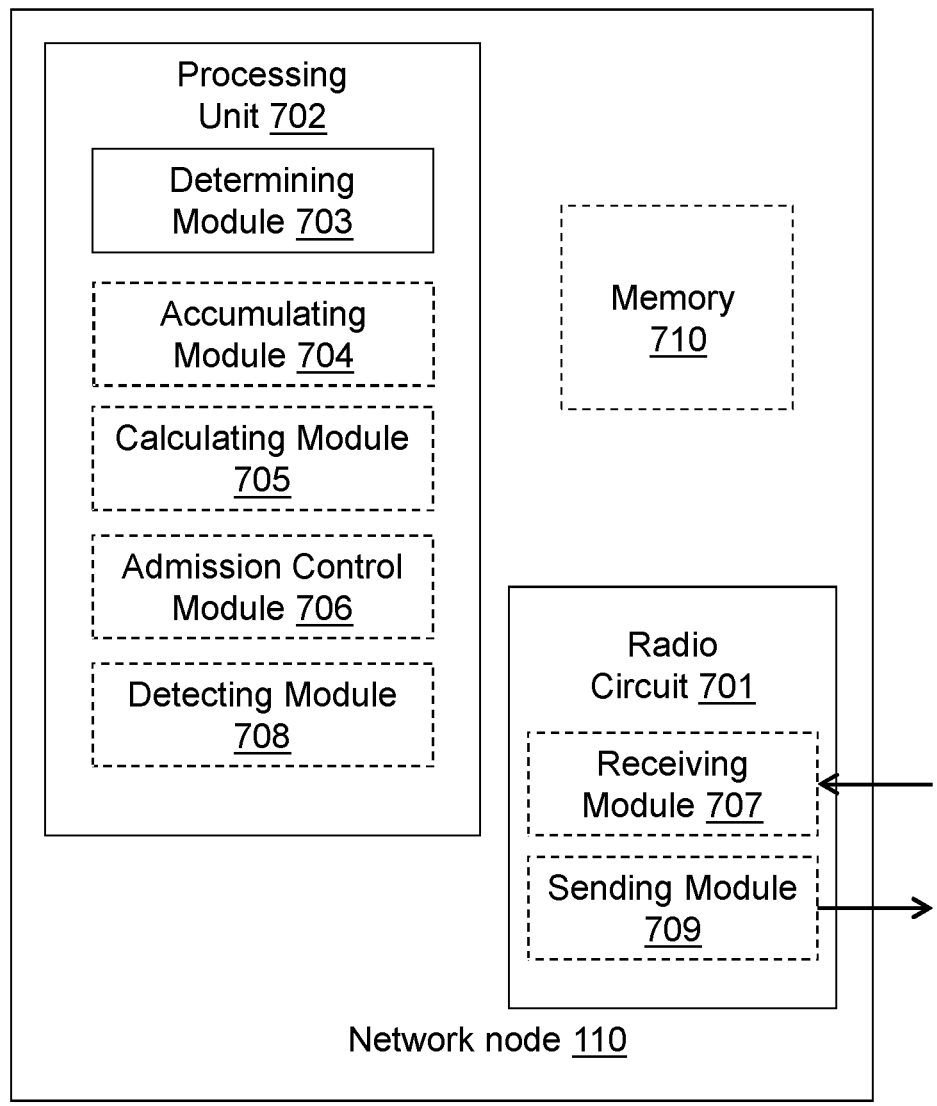
FIG. 7 is a schematic block diagram illustrating embodiments of a network node.

To perform the method actions for allocating resources to a User Equipment, UE, described above in relation to FIG. 3, the network node 110 may comprise the following arrangement depicted in FIG. 7. As mentioned above the network node 110 operates in a wireless communication network and serves the User Equipment, UE.

The network node 110 comprises a radio circuitry 701 to communicate with UEs 120.

The network node 110 is configured to, e.g. by means of a determining module 703 being configured to, determine a system load of the network node 110 for the UE 120.

The network node 110 may be configured to, e.g. by means of an accumulation module 704 being configured to, determine the load by accumulating the total number of system resources available according to each one of the determined system load metrics, for a period of time.

The network node 110 may further be configured to, e.g. by means of the accumulation module 704 being configured to, accumulate the number of system resources that are used by UEs 120 connected to the network node 110 according to each one of the determined system load metrics, for the same period of time.

The network node 110 may further be configured to, e.g. by means of a calculating module 705 being configured to, calculate the load by dividing the amount of system resources used by UEs 120 with the total number of system resources available, when the period of time has expired.

In some embodiments herein, the network node 110 may further be configured to, e.g. by means of the accumulating module being configured to, only accumulate the number of system resources that are used by UEs 120 for UEs 120 which are allocated resources and are scheduled with a Quality of Service, QoS, requirement above a threshold.

The network node 110 is further configured to, e.g. by means of the determining module 703 being configured to, determine whether or not to allocate resources to the UE 120 based on the determined system load metrics, when the network node 110 has determined the system load.

In some embodiments herein the network node 110 is further configured to, e.g. by means of the determining module 110 being configured to, determine whether or not to allocate resources to the UE 120 by comparing each determined system load metrics with a threshold.

The network node 110 is further configured to, e.g. by means of an admission control module 706 being configured to, allocate resources to the UE 120 when the calculated load metrics are below the threshold. The network node 110 is further configured to, e.g. by means of the admission control module 706 being configured to, reject the request for resources from the UE 120, when at least one of the determined load metrics exceeds the threshold.

The network node 110 may further be configured to, e.g. by means of the admission control module 706 being configured to, reject or admit an allocation of resources to the UE 120.

In some embodiments herein the network node 110 may be configured to, e.g. by means of the admission control unit 706 being configured to, allocate resources for transmission of control information on the physical resource for carrying EPDCCH, when the UE 120 is adapted to receive control information on EPDCCH. The network node 110 may further be configured to, e.g. by means of the admission control unit 706 further being configured to, allocate resources for transmission of control information on the physical resource for carrying PDCCH, when the UE 120 is not adapted to receive control information on EPDCCH.

In some embodiments herein, the network node 110 is configured to, e.g. by means of the determining module 703 being configured to, determine the load for the UE 120 based on the load metrics for a UE 120 not adapted to receive control information on EPDCCH, when a UE 120 which is adapted to receive EPDCCH is rejected. The network node 110 may further be configured to, e.g. by means of the admission control module 706 being configured to, allocate the resources as for a UE 120 not adapted to receive control information on EPDCCH, when the load metrics for the UE 120 adapted to receive EPDCCH are below the threshold In some further embodiments herein the network node 110 may be configured to, e.g. by means of the admission control module 706 being configured to, apply different load metric thresholds dependent on a resource profile of the UE 120. The resource profile may be a measure of the amount of resources typically used by the type of UE 120. The network node 110 may be configured to apply a lower threshold for a UE 120 with a high resource profile and higher threshold for a UE 120 with a low resource profile.

The network node 110 may further be configured to, e.g. by means of an receiving module 707 being configured to, receive a request for resources from a UE 120. The receiving module 707 may be comprised in the radio circuitry 701.

The network node 110 may further be configured to, e.g. by means of a detecting module 708 being configured to, detect if the UE 120 is adapted to receive control information by means of Enhanced Physical Downlink Control CHannel, EPDCCH or not.

In order to detect if the UE 120 is adapted to receive control information by means of EPDCCH, the network node 110 may further be configured to, e.g. by means of a sending module 709, send a message to the UE 120, which message comprises a request for the UEs 120 capability to receive control information by means of EPDCCH. The network node 110 may further be configured to, e.g. by means of the receiving module 707 being configured to, receive a message from the UE 120, which message comprises the UEs 120 capability to receive control information by means of EPDCCH.

The embodiments herein for allocating resources to a UE 120 may be implemented through one or more processors, such as the processing unit 702 in the network node 110 depicted in FIG. 7, together with computer program code for performing the functions and actions of the embodiments herein. The program code mentioned above may also be provided as a computer program product, for instance in the form of a data carrier carrying computer program code for performing the embodiments herein when being loaded into the network node 110. One such carrier may be in the form of a CD ROM disc. It is however feasible with other data carriers such as a memory stick. The computer program code may furthermore be provided as pure program code on a server and downloaded to the network node 110.

The network node 110 may further comprise a memory 710 comprising one or more memory units. The memory 710 is arranged to be used to store obtained information, measurements, data, configurations, schedulings, and applications to perform the methods herein when being executed in the network node 110.

Those skilled in the art will also appreciate that the determining module 703, the accumulating module 704, the calculating module 705, the admission control unit 706 and detecting module 708 described above may refer to a combination of analog and digital circuits, and/or one or more processors configured with software and/or firmware, e.g. stored in the memory 710 that when executed by the one or more processors such as the processing unit 702 perform as described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

When using the word "set" herein, it shall be interpreted as meaning "one or more".

The embodiments herein are not limited to the above described preferred embodiments. Various alternatives, modifications and equivalents may be used. Therefore, the above embodiments should not be taken as limiting the scope of the invention, which is defined by the appending claims.

Note that although terminology from 3GPP LTE has been used in this disclosure to exemplify the embodiments herein, this should not be seen as limiting the scope of the embodiments herein to only the aforementioned system. Other wireless systems, including WCDMA, WiMax, UMB and GSM, may also benefit from exploiting the ideas covered within this disclosure.

The invention claimed is:

1. Method performed by a network node for allocating resources to a User Equipment, UE, which network node operates in a wireless communication network and serves the UE, the method comprises:
   determining a system load of the network node for the UE, wherein when the UE is capable of receiving control information on EPDCCH, the system load is determined based on:
     a first system load metrics on a physical resource shared by a Physical Downlink Shared CHannel, PDSCH, and EPDCCH, Enhanced Physical Downlink Control CHannel, which first load metrics comprises a load due to EPDCCH and a load due to multiplexed PDSCH, and
     a second system load metrics on the physical resource shared by the PDSCH and the EPDCCH, which second load metrics comprises a load due to multiplexed EPDCCH and a load due to PDSCH,
   when the UE is not capable of receiving control information on EPDCCH, the system load is determined based on:
     the first system load metrics on the physical resource shared by the PDSCH and EPDCCH, which first load metrics comprises a load due to EPDCCH and a load due to multiplexed PDSCH,
     a third system load metrics on a physical resource for carrying Physical Downlink Control CHannel, PDCCH;
   determining whether or not to allocate resources to the UE based on the determined system load metrics.

2. Method according to claim 1, wherein the determining whether or not to allocate comprises:
   comparing each determined system load metrics with a threshold,
   when the calculated load metrics are below the threshold,
   allocating resources to the UE,
   when at least one of the determined load metrics exceeds the threshold,
   rejecting a request for resources from the UE.

3. Method according to claim 1, wherein determining the load comprises:
   for a period of time, accumulating the total number of system resources available according to each one of the determined system load metrics,
   for the period of time, accumulating the number of system resources that are used by UEs connected to the network node according to each one of the determined system load metrics,
   dividing the amount of system resources used by UEs with the total number of system resources available, when the period of time has expired.

4. Method according to claim 3, wherein the number of system resources that are used by UEs are only accumulated for UEs which are allocated resources and are scheduled with a Quality of Service, QoS, requirement above a threshold.

5. Method according to claim 1, wherein the allocating of resources comprises,
   allocating resources for transmission of control information on the physical resource for carrying EPDCCH, when the UE is adapted to receive control information on EPDCCH, and
   allocating resources for transmission of control information on the physical resource for carrying PDCCH, when the UE is not adapted to receive control information on EPDCCH.

6. Method according to claim 2, when a UE which is adapted to receive EPDCCH is rejected, determining the load for the UE based on the load metrics for a UE not adapted to receive control information on EPDCCH, and when the load metrics are below the threshold the resources are allocated as for a UE not adapted to receive control information on EPDCCH.

7. Method according to claim 2, wherein the load metrics thresholds depend on a resource profile of the UE, which resource profile is a measure of the amount of resources typically used by the type of UE, and wherein the thresholds are lower for a UE with a high resource profile and higher for a UE with a low resource profile.

8. Method according to claim 1, wherein the method further comprises:
   receiving a request for resources from the UE,
   detecting when the UE is adapted to receive control information by means of Enhanced Physical Downlink Control CHannel, EPDCCH.

9. Method according to claim 8, wherein the detecting ( )comprises:
   sending a message to the UE, which message comprises a request for the UEs capability to receive control information by means of EPDCCH,
   receiving a message from the UE, which message comprises the UEs capability to receive control information by means of EPDCCH.

10. Network node configured for allocating resources to a User Equipment, UE, which network node operates in a wireless communication network and serves the UE wherein the network node comprises:
    at least one processor; and
    at least one memory storing program code executed by the at least one processor to configure the network node to perform operations comprising:
      determine a system load for the UE, wherein
        when the UE is capable of receiving control information on EPDCCH, the network node is configured to determine the system load based on:
          a first system load metrics on a physical resource shared by a Physical Downlink Shared CHannel, PDSCH, and EPDCCH, Enhanced Physical Downlink Control CHannel, which first load metrics comprises a load due to EPDCCH and a load due to multiplexed PDSCH, and a second system load metrics on the physical resource shared
          a second system load metrics on the physical resource shared by the PDSCH and the EPD- CCH, which second load metrics comprises a load due to multiplexed EPDCCH and a load due to PDSCH,
when the UE is not capable of receiving control information on EPDCCH, the network node is configured to determine the system load is based on:
the first system load metrics on the physical resource shared by the PDSCH and EPDCCH, which first load metrics comprises a load due to EPDCCH and a load due to multiplexed PDSCH,
a third system load metrics on a physical resource for carrying Physical Downlink Control CHannel, PDCCH;
determine whether or not to allocate resources to the UE based on the determined system load metrics.

11. Network node according to claim 10, wherein the network node in order to determine whether or not to allocate is further configured to:
compare each determined system load metrics with a threshold,
reject a request for resources from the UE when at least one of the determined load metrics exceeds the threshold,
allocate resources to the UE when the calculated load metrics are below the threshold.

12. Network node according to claim 10, wherein the network node in order to determine the load further is configured to:
for a period of time, accumulate the total number of system resources available according to each one of the determined system load metrics,
for the period of time, accumulate the number of system resources that are used by UEs connected to the network node according to each one of the determined system load metrics,
divide the amount of system resources used by UEs with the total number of system resources available, when the period of time has expired.

13. Network node according to claim 12, wherein the network node is configured to accumulate the number of system resources that are used by UEs only for UEs which are allocated resources and are scheduled with a Quality of Service, QoS, requirement above a threshold.

14. Network node according to claim 10, wherein the network node in order to allocate resources further is configured to:
allocate resources for transmission of control information on the physical resource for carrying EPDCCH, when the UE is adapted to receive control information on EPDCCH, and
allocate resources for transmission of control information on the physical resource for carrying PDCCH, when the UE is not adapted to receive control information on EPDCCH.

15. Network node according to claim 10, wherein the network node, when a UE which is adapted to receive EPDCCH is rejected, further is configured to determine the load for the UE based on the load metrics for a UE not adapted to receive control information on EPDCCH, and when the load metrics are below the threshold further is configured to allocate the resources as for a UE not adapted to receive control information on EPDCCH.

16. Network node according to claim 10, wherein the network node is configured to select the load metric thresholds dependent on a resource profile of the UE, which resource profile is a measure of the amount of resources typically used by the type of UE, and wherein the thresholds are lower for a UE with a high resource profile and higher for a UE with a low resource profile.

17. Network node according to claim 10, wherein the network node further is configured to:
receive a request for resources from the UE,
detect when the UE is adapted to receive control information by means of Enhanced Physical Downlink Control CHannel, EPDCCH.

18. Network node according to claim 17, wherein the network node in order detect when the UE is adapted to receive control information further is configured to:
send a message to the UE, which message comprises a request for the UEs capability to receive control information by means of EPDCCH,
receive a message from the UE, which message comprises the UEs capability to receive control information by means of EPDCCH.

* * * * *